(12) United States Patent
Chen et al.

(10) Patent No.: US 6,682,664 B1
(45) Date of Patent: Jan. 27, 2004

(54) HIGH BRIGHTNESS ORANGE-YELLOW-EMITTING ELECTROLUMINESCENT PHOSPHOR AND METHOD OF MAKING

(75) Inventors: Xianzhong Chen, Sayre, PA (US); Robert L. Stevens, Towanda, PA (US); Judy A. Belinski-Wolfe, Towanda, PA (US); Fuqiang Huang, Evanston, IL (US); Chen Wen Fan, Sayre, PA (US); Michael A. Maxwell, Corning, NY (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 10/235,243

(22) Filed: Sep. 5, 2002

(51) Int. Cl.$^7$ .......................... G09K 11/56; G09K 11/54
(52) U.S. Cl. .................................. 252/301.6 S
(58) Field of Search ...................... 252/301.65

(56) References Cited

U.S. PATENT DOCUMENTS

| | | | |
|---|---|---|---|
| 4,859,361 A | 8/1989 | Reilly et al. | 252/301.6 S |
| 5,009,808 A | 4/1991 | Reilly et al. | 252/301.6 S |
| 5,702,643 A | 12/1997 | Reddy et al. | 252/301.65 |
| 6,395,196 B1 | 5/2002 | Gingerich et al. | 252/301.6 S |

FOREIGN PATENT DOCUMENTS

| | | |
|---|---|---|
| JP | 4-270780 | 9/1992 |
| JP | 5-230448 | 9/1993 |

*Primary Examiner*—C. Melissa Koslow
(74) *Attorney, Agent, or Firm*—Robert F. Clark

(57) ABSTRACT

An orange-yellow-emitting zinc sulfide-based electroluminescent phosphor is described wherein the phosphor has a brightness of greater than 10 foot-Lamberts. More particularly, the phosphor has a brightness of at least about 13 foot-Lamberts and an x color coordinate from about 0.51 to about 0.56 and a y color coordinate from about 0.42 to about 0.48. The zinc sulfide phosphor is activated with manganese, copper, chlorine, and a metal selected from gold and antimony.

19 Claims, No Drawings

HIGH BRIGHTNESS ORANGE-YELLOW-EMITTING ELECTROLUMINESCENT PHOSPHOR AND METHOD OF MAKING

TECHNICAL FIELD

This invention relates to zinc sulfide-based electroluminescent phosphors. More specifically, it relates to orange-yellow-emitting zinc sulfide-based electroluminescent phosphors co-activated with manganese and copper.

BACKGROUND OF THE INVENTION

Orange-yellow-emitting zinc sulfide electroluminescent phosphors co-activated with manganese and copper ions (ZnS:Mn,Cu) are well known. Examples of these phosphors and their methods of manufacture are described in U.S. Pat. Nos. 4,859,361 and 5,009,808. These phosphors are significantly lower in brightness than other ZnS-based phosphors. For example, the brightness of commercially available Zn:Mn,Cu phosphors is under 10 foot-Lamberts (ft-L) whereas the brightness of commercial blue-green emitting ZnS:Cu,Cl electroluminescent phosphors is greater than 30 ft-L.

U.S. Pat. No. 5,702,643 and JP 4-270780 describe improving the half-life of copper-activated zinc sulfide (ZnS:Cu) phosphors by incorporating small amounts of gold into the phosphor. U.S. Pat. No. 6,395,196 describes increasing the half-life of a ZnS:Cu electroluminescent phosphor by heating the finished phosphor in a closed vessel in the presence of antimony vapor. However, these techniques are insufficient to achieve the brightness levels needed to meet current market requirements. In particular, higher brightness orange-yellow-emitting electroluminescent phosphors are needed for forming white-emitting phosphor blends which could be used in electroluminescent lamps for backlighting color LCD displays. Therefore, it is desirable to improve the brightness of orange-yellow-emitting zinc sulfide electroluminescent phosphors.

SUMMARY OF THE INVENTION

It is an object of the invention to obviate the disadvantages of the prior art.

It is another object of the invention to provide a high brightness orange-yellow-emitting electroluminescent phosphor.

It is a further object of the invention to provide a method of making a high-brightness orange-yellow-emitting electroluminescent phosphor.

In one aspect of the invention, an orange-yellow-emitting zinc sulfide-based electroluminescent phosphor is provided which has a brightness greater than 10 foot-Lamberts and an x color coordinate from about 0.51 to about 0.56 and a y color coordinate from about 0.42 to about 0.48.

In another aspect of the invention, the orange-yellow-emitting electroluminescent phosphor comprises zinc sulfide activated with copper, manganese, chlorine, and a metal selected from gold and antimony, wherein the phosphor contains about 0.5 to about 1.3 weight percent manganese, about 0.02 to about 0.08 weight percent copper, about 0.002 to about 0.02 weight percent chlorine, 0 to about 0.012 weight percent gold, and 0 to about 0.0007 weight percent antimony.

In yet another aspect of the invention, a method of making an orange-yellow-emitting electroluminescent phosphor is provided wherein the method comprises:

(a) forming a mixture of an amount of zinc sulfide, an amount of a copper source, an amount of a manganese source, an amount of zinc oxide, an amount of sulfur, an amount of a chloride-containing flux, and an amount of a source of a metal selected from a gold and antimony;

(b) firing the mixture at a temperature from about 1100° C. to about 1250° C. for about 3 hours to about 5 hours;

(c) mechanically working the fired material to introduce defects in the crystal structure;

(d) washing the fired mixture to remove the chloride-containing flux and copper sulfide residues;

(e) combining the fired material with an amount of a copper source, an amount of a manganese source, and an amount of zinc oxide to form a second mixture;

(f) firing the second mixture at a temperature from about 750° C. to about 950° C. for about 2 hours to about 5 hours and fast cooling the fired second mixture; and (g) washing the second mixture to remove residual copper sulfide.

DETAILED DESCRIPTION OF THE INVENTION

For a better understanding of the present invention, together with other and further objects, advantages and capabilities thereof, reference is made to the following disclosure and appended claims.

A high-brightness orange-yellow-emitting electroluminescent phosphor has been invented. The phosphor comprises zinc sulfide activated with copper, manganese, chlorine, and a metal selected from gold and antimony. The phosphor exhibits a brightness of greater than 10 foot-Lamberts (ft-L), and preferably at least about 13 ft-L, when stimulated in a conventional thick-film electroluminescent lamp. The orange-yellow emission has an x color coordinate from about 0.51 to about 0.56 and a y color coordinate from about 0.42 to about 0.48.

The phosphor preferably contains from about 0.5 to about 1.3 weight percent manganese, about 0.02 to about 0.08 weight percent copper, about 0.002 to about 0.02 weight percent chlorine, 0 to about 0.012 weight percent gold, and 0 to about 0.0007 weight percent antimony. A more preferred range for the gold content of the phosphor is from about 0.002 to about 0.012 weight percent gold and a more preferred range for the antimony content is from greater than 0 to about 0.0007 weight percent antimony. It should be noted that the amount of antimony retained in the finished phosphor may be very difficult to detect. In these cases, it is assumed that because antimony was added during the first firing step some antimony is retained even though it could not be detected in the chemical analysis.

The high-brightness phosphor of this invention is made in two firing steps. In the first firing step, zinc sulfide (ZnS) is blended with appropriate amounts of a source of copper (Cu), zinc oxide (ZnO), sulfur (S), a chloride-containing flux, and a source of a metal selected from gold and antimony. Preferably, the Au source is a pre-mixture of gold chloride ($AuCl_3$) and ZnS, the Cu source is anhydrous copper sulfate ($CuSO_4$), and the Sb source is a pre-mixture of antimony oxide ($Sb_2O_3$) and ZnS. The chloride-containing flux can be a mixture of alkali metal and alkaline earth chlorides, preferably barium chloride ($BaCl_2$), magnesium chloride ($MgCl_2$), and sodium chloride (NaCl). The blended mixture preferably contains in weight percent (wt. %) relative to the weight of ZnS: 0 to 0.018 wt. % Au, 0.02 to 0.08 wt. % Cu, 0 to 0.01 wt. % Sb, 0.3 to 0.7 wt. % ZnO, 6 to 12 wt. % sulfur, and 4 to 14 wt. % chloride flux (preferably 0–4 wt. % of barium chloride, 1–5 wt. % of magnesium chloride, and 1–5 wt. % of sodium chloride). More preferably, the blended mixture contains 0.008 to 0.18 wt. % Au. Even more preferably, the blended mixture contains 0.001 to 0.01 wt. % Sb.

The blended mixture is fired in air at a temperature from about 1100° C. to about 1250° C. for about 3 to about 5 hours. A fast cooling after the first firing is preferred but is not critical. The fast cooling is achieved by placing the red hot crucible into a water bath. Water is kept running to maintain the water bath at <60° C. The fired material is then water washed, dried, and gently mulled (low-intensity milling) to induce defects in its crystal structure. The mulling time depends on the particular type of equipment used and the amount of material being mulled. An optimum mulling time can be readily determined by one skilled in the art of electroluminescent phosphors. In our case, a typical mulling time was 75 minutes for 500 to 550 g of material.

After mulling, the material is washed with acid and then a basic solution containing sodium hydroxide (NaOH), hydrogen peroxide ($H_2O_2$), and a chelating agent, such as diethylenetriaminepentaacetic acid (DTPA). In a preferred method, the basic solution contains relative to the phosphor weight: 2–4 wt. % DTPA, 2.5–3.5 wt. % NaOH, and 5–15 wt. % of a 30% $H_2O_2$ solution. This chemical wash further removes flux residues and copper sulfides from the phosphor surface. A KCN solution may be used in place of the basic solution to remove the copper sulfide residue. The material is then washed with hot deionized water and then dried to complete the first firing step.

In the second firing step, the material from the first firing step is blended with appropriate amounts of a copper source, a manganese source, and zinc oxide. Preferably, the material from the first firing step is blended with 0.2–0.8 wt. % anhydrous copper sulfate ($CuSO_4$), 2–10 wt. % manganese carbonate ($MnCO_3$), and 5–15 wt. % zinc oxide (ZnO) The blended material may then be fired once in air at a temperature from about 750° C. to about 950° C. for about 2 to about 5 hours or fired twice in the same temperature range first for about 1 to about 3 hours and then for about 0.5 to about 2 hours. It is preferred that the fired material be fast cooled since a slow cooling rate will degrade brightness. If the second firing is done on two stages, then the fast cooling is used after the second stage. As used herein, fast cooling means that the material is cooled to below about 200° C. in less than about one hour. Slow cooling means that material is cooled to below about 200° C. in more than 2 hours. The fired material is washed with hot deionized water, acid, and the basic solution of DTPA-NaOH-$H_2O_2$ used in the first firing step. After a final water washing to remove any remaining chemical residues, the material is dried and sifted to form a high-brightness orange-yellow-emitting electroluminescent phosphor. The finished phosphor typically has a particle size between 18 to 28 μm.

Several examples of the high-brightness orange-yellow-emitting phosphor are shown below. All phosphors were tested in conventional thick-film electroluminescent lamps operated at 100 V and 400 Hz in a 50% R.H, 70° F. environment. The test lamps are comprised of a ~40 μm-thick phosphor layer and an approximately 26 μm-thick barium titanate dielectric layer. The lamps are constructed by combining the phosphor with a cyanoresin binder (Shin Etsu Co.) which has been dissolved in a mixture of acetone and dimethylformamide. In particular, the binder is made by mixing 575 g of acetone, 575 g of dimethylformamide, and 400 g of cyanoresin. The percentage of phosphor in the liquid binder is 75 wt. % and the percentage of phosphor after the binder-phosphor mix is dried is 80 wt. %. The phosphor suspension is blade coated onto a 0.007–0.0075 in.-thick PET film having a transparent, conductive layer of indium-tin oxide (ITO) (available from CPFilms). After drying, the barium titanate layer is applied over the phosphor layer in the same way using a suspension of barium titantate dispersed in the cyanoresin binder. In particular, the binder-barium titanate mix is made by mixing 375 g of cyanoresin binder, 375 g of barium titanate, and 82.5 g of dimethylformamide. The percentage of barium titanate in the binder is 45 wt. % and the percentage of barium titanate in the binder after drying is 80 wt. %. A rear electrode comprised of a 50 to 80 μm-thick graphite layer is applied to the dried barium titanate dielectric layer using a graphite suspension (Acheson Colloids). Lead wires are attached and the entire lamp is laminated with a clear, flexible film (Aclam TC200 from Honeywell Corp.) which is applied to both sides. The lamps were operated from 24 hours prior to measuring their brightness in order to stabilize the lamps and obtain representative measurements. Brightness as used herein means the brightness of the phosphor in a conventional thick-film electroluminescent lamp which has been operated at 100 V and 400 Hz for 24 hours.

EXAMPLE 1

A 550 g amount of ZnS containing about 1 wt. % chlorine was mixed with 15.58 g of a mixture of ZnS and $AuCl_3$ containing 0.5 wt .% Au, 0.55 g of anhydrous $CuSO_4$, 1.65 g of a mixture of ZnS and $Sb_2O_3$ containing 1.67 wt. % Sb, 2.86 g of zinc oxide (ZnO), 45.66 g of sulfur, and a chloride flux containing 8.56 g barium chloride ($BaCl_2$), 25.68 g magnesium chloride ($MgCl_2$), and 11.41 g sodium chloride (NaCl). The ZnS mixture was then fired in air at 1150° C. for 4 hours and 15 minutes. The fired material was fast cooled by placing the hot crucibles into a water bath. The fired material was then washed with hot deionized water several times to remove most of the chloride flux and dried at 120° C. for 15 hours. The material was mulled for 75 minutes and then washed with an acetic acid solution (2.8M) followed by a basic solution containing 4 wt. % DTPA, 2.8 wt. % NaOH, and 10 wt. % $H_2O_2$ (30% solution). The phosphor was then washed with hot deionized water and then dried at 120° C. for 15 hours to complete the first firing step. In the second firing step, 50 g of material from the first firing step was blended with 0.25 g $CuSO_4$, 3.16 g $MnCO_3$, and 5.00 g ZnO and fired in air at 800° C. for 2 hours and 15 minutes. After cooling, the fired cake was fired again at 800° C. for 60 to 90 minutes. After the fired cake was removed from the furnace, it was fast cooled to below 200° C. within 40 minutes. The fired material was washed with hot deionized water, acetic acid, and then twice with a basic solution of DTPA-NaOH—$H_2O_2$ (4.5 wt. % DTPA, 3.8 wt. % NaOH, and 10 wt. % $H_2O_2$ (30% solution). After a final water washing, the material was dried and sifted. As shown in Table 1, this phosphor had a significantly improved brightness compared to a standard commercial orange-yellow-emitting ZnS:Mn,Cu phosphor (OSRAM SYLVANIA Type 523).

TABLE 1

| Property | | Example 1 | Standard |
|---|---|---|---|
| Particle size (μm) | | 26 | N/A |
| 24 hour brightness (ft-L) | | 15.5 | 9.6 |
| Color | x | 0.536 | 0.523 |
| Coordinates | y | 0.456 | 0.455 |

EXAMPLE 2

A second series of phosphors were prepared according to the procedure of Example 1. Although Sb was added during initial mixing, its level in the finished phosphors was below the detection limit of the ICP analysis. The measured properties of the phosphors are given in Table 2.

TABLE 2

| Example | 2A | 2B | 2C | 2D | 2E |
|---|---|---|---|---|---|
| Particle size ($\mu$m) | 2.1 | 21 | 21 | 21 | 20 |
| ICP analysis | | | | | |
| Au (ppm) | 93 | 93 | 86 | 89 | 90 |
| Cu (ppm) | 480 | 460 | 440 | 450 | 440 |
| Nn (%) | 0.84 | 0.76 | 0.58 | 0.65 | 0.77 |
| Sb (ppm) | <7 | <7 | <7 | <7 | <7 |
| 24 hour brightness (ft-L) | 15 | 15 | 13.7 | 13 | 14.5 |
| Color Coord. x | 0.533 | 0.534 | 0.534 | 0.532 | 0.538 |
| y | 0.458 | 0.457 | 0.454 | 0.455 | 0.455 |

EXAMPLES 3–6

These phosphors were made similarly to Example 1 except that 17.12 g $BaCl_2$ and 17.12 g $MgCl_2$ were used in the flux system. The amount of $BaCl_2$ is increased and the amount of $MgCl_2$ is reduced accordingly to balance the total flux level. Data for these examples is given in Table 3. The data show that the higher $BaCl_2$ level in the flux has a detrimental affect on brightness. The data also indicate that higher levels of gold coupled with lower levels of antimony has a positive affect on brightness.

TABLE 3

| Example | 3 | 4 | 5 | 6 |
|---|---|---|---|---|
| Sb added (wt. %) | 0.0050 | 0.0050 | 0.010 | 0.010 |
| Au added (wt. %) | 0.014 | 0.0070 | 0.0070 | 0.014 |
| Particle size ($\mu$m) | 22 | 22 | 20 | 21 |
| 24 hour brightness (ft-L) | 11.7 | 10.4 | 8.8 | 9.6 |
| Color x | 0.535 | 0.530 | 0.525 | 0.526 |
| Coordinates y | 0.458 | 0.453 | 0.451 | 0.452 |

EXAMPLES 7–10

These four phosphors were made similarly to Example 1 but with different amounts of Cu. The amount of anhydrous $CuSO_4$ added during the first firing step is given in the Table 4. The brightness data in Table 4 indicate that the preferred range of copper added in the first firing step is preferably between 0.030 to 0.040 wt. % Cu.

TABLE 4

| Examples | 7 | 8 | 9 | 10 |
|---|---|---|---|---|
| Cu added in first firing step (wt. %) | 0.020 | 0.030 | 0.040 | 0.087 |
| Particle size ($\mu$m) | 20 | 19 | 19 | 21 |
| 24 h brightness (ft-L) | 9.2 | 13.3 | 12.4 | 11.4 |
| Color x | 0.536 | 0.537 | 0.536 | 0.535 |
| Coordinates y | 0.456 | 0.457 | 0.458 | 0.454 |

EXAMPLES 11–15

These phosphors were made similarly to Example 8 except that they had different second step firings as shown in Table 5. The brightness data in Table 5 suggest that a longer firing time has a positive affect on brightness. The second firing step in Examples 13–15 was performed as two separate firings.

TABLE 5

| Example | 11 | 12 | 13 | 14 | 15 |
|---|---|---|---|---|---|
| $2^{nd}$ step firing | 135 min | 225 min | 135 min 30 min | 135 min 60 min | 135 min 90 min |
| Particle size ($\mu$m) | 19 | 19 | 19 | 19 | 20 |
| 24 hour brightness (ft-L) | 13.2 | 13.9 | 13.1 | 13.1 | 13.6 |
| Color x | 0.535 | 0.536 | 0.536 | 0.535 | 0.538 |
| Coord. y | 0.454 | 0.454 | 0.453 | 0.453 | 0.455 |

EXAMPLES 16 and 17

Example 16 was made similarly to Example 8 except that 0.040 wt. % Cu was added in the first firing step. Example 17 is made similarly to Example 16 except that no Sb was added. The data in Table 6 demonstrate that Sb improves brightness.

TABLE 6

| Example | 16 | 17 |
|---|---|---|
| Sb added (wt. %) | 0.0050% | none |
| Particle size ($\mu$m) | 21 | 21 |
| 24 h brightness (ft-L) | 12.1 | 11.5 |
| Color x | 0.532 | 0.530 |
| Coordinates y | 0.451 | 0.450 |

EXAMPLES 18–19

These phosphors were made similarly to Example 8 except that 0.040 wt. % Cu was added in the first firing step. The two materials were cooled differently after the first firing step. The data show that fast cooling after the first firing step enhances brightness.

TABLE 7

| Example | 18 | 19 |
|---|---|---|
| Cooling method | Fast | Slow |
| Particle size ($\mu$m) | 22 | 21 |
| 24 h brightness (ft-L) | 14.7 | 13.8 |
| Color x | 0.537 | 0.537 |
| Coordinates y | 0.454 | 0.455 |

EXAMPLES 20–24

A series of phosphor samples were made by combining 550 g ZnS with 0.554 g $CuSO_4$, 44.00 g S, 2.75 g ZnO, 11.00 g NaCl, 16.5 g $MgCl_2$, 16.5 g $BaCl_2$ and varied amounts of $Sb_2O_3$ (see Table 8). The mixtures were fired in covered crucibles for 4.25 hours at 1150° C. The fired material was removed from the furnace and washed multiple times with hot deionized (DI) water to remove the chloride flux. The washed material was filtered, dried at 120° C. for 8–12 hours, sieved to −100 mesh, and low-intensity milled for 75 minutes.

The fired material was blended with 0.6 wt. % $CuSO_4$, 6.32 wt. % $MnCO_3$, and 32.5 wt. % $ZnSO_4$ $7H_2O$ by weight of the fired material. The mixtures were then fired in covered crucible for 2.25 hours at 800° C. and washed as follows: twice with acetic acid, once with hydrochloric acid (200 ml HCl in 1050 ml hot DI water), three times with hot DI water, once with a KCN solution (50 g KCN in 1050 ml hot DI water), and four times with hot DI water. The material was then filtered, dried, and sieved to −325 mesh. The emission characteristics of the finished phosphors are shown in Table 8.

TABLE 8

| Example | $Sb_2O_3$ (g) added | 24 hour brightness (ft-L) | Color Coordinates | | Sb (ppm) in finished phosphor |
| --- | --- | --- | --- | --- | --- |
| | | | x | y | |
| 20 | 0.0165 | 13.1 | 0.533 | 0.461 | <8 |
| 21 | 0.0330 | 13.3 | 0.531 | 0.461 | <8 |
| 22 | 0.0495 | 12.8 | 0.534 | 0.460 | <8 |
| 23 | 0.0660 | 13.0 | 0.533 | 0.458 | <8 |
| 24 | 0.1980 | 10.9 | 0.530 | 0.458 | 23 |

While there has been shown and described what are at the present considered the preferred embodiments of the invention, it will be obvious to those skilled in the art that various changes and modifications may be made therein without departing from the scope of the invention as defined by the appended claims.

We claim:

1. An orange-yellow-emitting zinc sulfide-based electroluminescent phosphor having a brightness greater than 10 foot-Lamberts and an x color coordinate from about 0.51 to about 0.56 and a y color coordinate from about 0.42 to about 0.48.

2. The phosphor of claim 1 wherein the brightness of the phosphor is at least about 13 foot-Lamberts.

3. The phosphor of claim 1 wherein the phosphor contains manganese, copper, chlorine, and a metal selected from gold and antimony.

4. The phosphor of claim 3 wherein the phosphor contains gold and antimony.

5. The phosphor of claim 4 wherein the brightness of the phosphor is at least about 13 foot-Lamberts.

6. An orange-yellow emitting electroluminescent phosphor comprising zinc sulfide activated with copper, manganese, chlorine, and a metal selected from gold and antimony, wherein the phosphor contains about 0.5 to about 1.3 weight percent manganese, about 0.02 to about 0.08 weight percent copper, about 0.002 to about 0.02 weight percent chlorine, 0 to about 0.012 weight percent gold, and 0 to about 0.0007 weight percent antimony.

7. The phosphor of claim 6 where the phosphor contains from about 0.002 to about 0.012 weight percent gold.

8. The phosphor of claim 6 wherein the phosphor contains from greater than 0 to about 0.0007 weight percent antimony.

9. The phosphor of claim 8 where the phosphor contains from about 0.002 to about 0.012 weight percent gold.

10. A method of making an orange-yellow-emitting electroluminescent phosphor comprising:

(a) forming a mixture of an amount of zinc sulfide, an amount of a copper source, an amount of a manganese source, an amount of zinc oxide, an amount of sulfur, an amount of a chloride-containing flux, and an amount of a source of a metal selected from a gold and antimony;

(b) firing the mixture at a temperature from about 1100° C. to about 1250° C. for about 3 hours to about 5 hours;

(c) mechanically working the fired material to introduce defects in the crystal structure;

(d) washing the fired mixture to remove the chloride-containing flux and copper sulfide residues;

(e) combining the fired material with an amount of a copper source, an amount of a manganese source, and an amount of zinc oxide to form a second mixture;

(f) firing the second mixture at a temperature from about 750° C. to about 950° C. for about 2 hours to about 5 hours and fast cooling the fired second mixture; and (g) washing the second mixture to remove residual copper sulfide.

11. The method of claim 10 wherein the mixture in step (a) contains in weight percent relative to the weight of ZnS from 0 to 0.018 weight percent Au, 0.02 to 0.08 weight percent Cu, 0 to 0.01 weight percent Sb, 0.3 to 0.7 weight percent ZnO, 6 to 12 weight percent sulfur, and 4 to 14 weight percent chloride-containing flux.

12. The method of claim 11 wherein the mixture in step (a) contains from 0.008 to 0.18 weight percent gold.

13. The method of claim 11 wherein the mixture in step (a) contains from 0.001 to 0.01 weight percent antimony.

14. The method of claim 13 wherein the mixture in step (a) contains from 0.008 to 0.18 weight percent gold.

15. The method of claim 11 wherein the washing in steps (d) and (g) includes an acid wash and a wash with a basic solution of sodium hydroxide, hydrogen peroxide, and diethylenetriaminepentaacetic acid.

16. The method of claim 15 wherein the basic solution contains relative to the phosphor weight 2–4 weight percent diethylenetriaminepentaacetic acid, 2.5–3.5 weight percent sodium hydroxide, and 5–15 weight percent of a 30% hydrogen peroxide solution.

17. The method of claim 11 wherein the mixture in step (b) is fast cooled after firing.

18. The method of claim 11 wherein the fired material is combined in step (e) with 0.2 to 0.8 weight percent anhydrous copper sulfate, 2 to 10 weight percent manganese carbonate, and 5 to 15 weight percent zinc oxide.

19. The method of claim 18 wherein the washing in steps (d) and (g) includes an acid wash and a wash with a basic solution of sodium hydroxide, hydrogen peroxide, and diethylenetriaminepentaacetic acid.

* * * * *